(12) United States Patent
Taruno

(10) Patent No.: US 11,225,351 B2
(45) Date of Patent: Jan. 18, 2022

(54) DELAMINATABLE CONTAINER

(71) Applicant: KYORAKU CO., LTD., Kyoto (JP)

(72) Inventor: Shinsuke Taruno, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 16/479,355

(22) PCT Filed: Jan. 19, 2018

(86) PCT No.: PCT/JP2018/001544
§ 371 (c)(1),
(2) Date: Jul. 19, 2019

(87) PCT Pub. No.: WO2018/139355
PCT Pub. Date: Aug. 2, 2018

(65) Prior Publication Data
US 2019/0352037 A1   Nov. 21, 2019

(30) Foreign Application Priority Data
Jan. 26, 2017   (JP) .............................. JP2017-012006

(51) Int. Cl.
*B29C 49/04*   (2006.01)
*B65D 1/02*   (2006.01)
(Continued)

(52) U.S. Cl.
CPC ............ *B65D 1/0215* (2013.01); *B29C 49/04* (2013.01); *B65D 83/0061* (2013.01);
(Continued)

(58) Field of Classification Search
None
See application file for complete search history.

(56) References Cited

U.S. PATENT DOCUMENTS

| 5,447,678 A | 9/1995 | Kneer et al. |
| 5,799,809 A | 9/1998 | Sako et al. |

(Continued)

FOREIGN PATENT DOCUMENTS

| JP | S46-011991 B | 3/1971 |
| JP | S50-100165 A | 8/1975 |

(Continued)

OTHER PUBLICATIONS

International Search Report dated Feb. 13, 2018 in corresponding International Application No. PCT/JP2018/001544; 5 pages.
(Continued)

*Primary Examiner* — Monica A Huson
(74) *Attorney, Agent, or Firm* — Maier & Maier, PLLC

(57) ABSTRACT

A delaminatable container excellent in productivity is provided. The present invention provides a delaminatable container comprising a container body having an outer shell and an inner bag, the inner bag to be shrunk with a decrease in contents, wherein the container body includes a storage portion to store the contents and a bottom seal protrusion protruding from a bottom surface of the storage portion, the container body is configured to seal the outer shell and the inner bag in the bottom seal protrusion, and the bottom seal protrusion includes a tapered portion extending in a longitudinal direction of the bottom seal protrusion and tapered from the bottom surface toward an end.

1 Claim, 9 Drawing Sheets

(51) Int. Cl.
*B65D 83/00* (2006.01)
*B29C 49/22* (2006.01)
*B29C 49/42* (2006.01)
*B29C 49/48* (2006.01)
*B32B 43/00* (2006.01)

(52) U.S. Cl.
CPC .............. *B29C 49/22* (2013.01); *B29C 49/42* (2013.01); *B29C 49/4273* (2013.01); *B29C 49/48* (2013.01); *B32B 43/006* (2013.01)

(56) References Cited

U.S. PATENT DOCUMENTS

| | | | |
|---|---|---|---|
| 6,039,204 A * | 3/2000 | Hosokoshiyama | ........................... B29C 49/4817 220/623 |
| 7,017,761 B1 | 3/2006 | Kneer | |
| 2001/0032853 A1 | 10/2001 | Kuehn et al. | |
| 2004/0060889 A1 | 4/2004 | Yoneyama et al. | |
| 2004/0069735 A1 | 4/2004 | Yoneyama et al. | |

FOREIGN PATENT DOCUMENTS

| | | | |
|---|---|---|---|
| JP | H06-99965 A | 4/1994 | |
| JP | H07-88943 A | 4/1995 | |
| JP | H11-240527 A | 9/1999 | |
| JP | 3401519 B2 | 4/2003 | |
| JP | 2003-137344 A | 5/2003 | |
| JP | 2004-202965 A | 7/2004 | |
| JP | 2005-247039 A | 9/2005 | |
| TW | 504451 B | 10/2002 | |
| WO | 03037725 A1 | 5/2003 | |

OTHER PUBLICATIONS

Chinese Office Action dated Sep. 23, 2020, in corresponding Chinese Application No. 201880004967.3 (13 pp., including machine-generated English translation).

Taiwanese Office Action dated Jul. 9, 2021, in connection with corresponding TW Application No. 107101965 (13 pp., including machine-generated English translation).

Japanese Office Action dated Jul. 6, 2021, in connection with corresponding JP Application No. 2017-012006 (16 pp., including machine-generated English translation).

Taiwanese Office Action dated Aug. 23, 2021, in connection with corresponding TW Application No. 107101965 (15 pp., including machine-generated English translation).

* cited by examiner

DELAMINATABLE CONTAINER

TECHNICAL FIELD

The present invention relates to a delaminatable container.

BACKGROUND ART

Conventionally, delaminatable containers are known that include a container body having an outer shell and an inner bag, the inner bag to be shrunk with a decrease in contents (e.g., PTL 1). Such a container body is generally manufactured by blow molding using a cylindrical laminated parison. The container body has a bottom provided with a sealing portion for welding of one end of the laminated parison. Being less resistant to impact, the sealing portion is provided to protrude from the bottom surface of the container to increase the strength. In PTL 1, to further increase the strength of the sealing portion, welded layers in the sealing portion are welded to engage with each other with a plurality of protrusions.

CITATION LIST

Patent Literature

PTL 1: Japanese Patent No. 3401519

SUMMARY OF INVENTION

Technical Problem

The configuration of PTL 1 requires the die to be provided with pins to press a parison welded layer, causing a complex die structure and an increase in production costs. It is thus desired to reinforce the sealing portion by a simpler configuration.

The present invention has been made in view of such circumstances and is to provide a delaminatable container excellent in productivity.

Solution to Problem

The present invention provides a delaminatable container including a container body having an outer shell and an inner bag, the inner bag to be shrunk with a decrease in contents, wherein the container body includes a storage portion to store the contents and a bottom seal protrusion protruding from a bottom surface of the storage portion, the container body is configured to seal the outer shell and the inner bag in the bottom seal protrusion, and the bottom seal protrusion includes a tapered portion extending in a longitudinal direction of the bottom seal protrusion and tapered from the bottom surface toward an end.

The present inventor made an intensive review to find that the sealing portion is reinforced by a simple configuration of tapering the bottom seal protrusion protruding from the bottom surface of the storage portion of the container body and thus has come to complete the present invention.

Various embodiments of the present invention are described below as examples. The embodiments below may be combined with each other.

Preferably, the bottom seal protrusion is configured to have an outer layer constituting the outer shell welded to each other at least in a partial region.

Preferably, the bottom seal protrusion further includes a thin wall portion thinner than the tapered portion along the longitudinal direction in an end position of the tapered portion.

Preferably, the bottom seal protrusion has a thickness twice a thickness of the bottom surface or less.

Preferably, the bottom surface includes a recessed region provided with the bottom seal protrusion, the recessed region is provided across the entire bottom surface in the longitudinal direction.

The present invention also provides a method of manufacturing a delaminatable container, containing a container body having an outer shell and an inner bag, the inner bag to be shrunk with a decrease in contents, the method including blow molding using a cylindrical laminated parison including an outer layer constituting the outer shell and an inner layer constituting the inner bag, wherein, in the blow molding, using a die with a pair of tapered surfaces inclined to be directed inside the container formed near a pinch-off, a sealing portion of the laminated parison is formed by the tapered surfaces.

Preferably, the die includes a thin wall forming portion with an interspace narrower than the pair of tapered surfaces, the thin wall forming portion being provided on a pinch-off side from the tapered surfaces.

DESCRIPTION OF EMBODIMENTS

Figure 1:
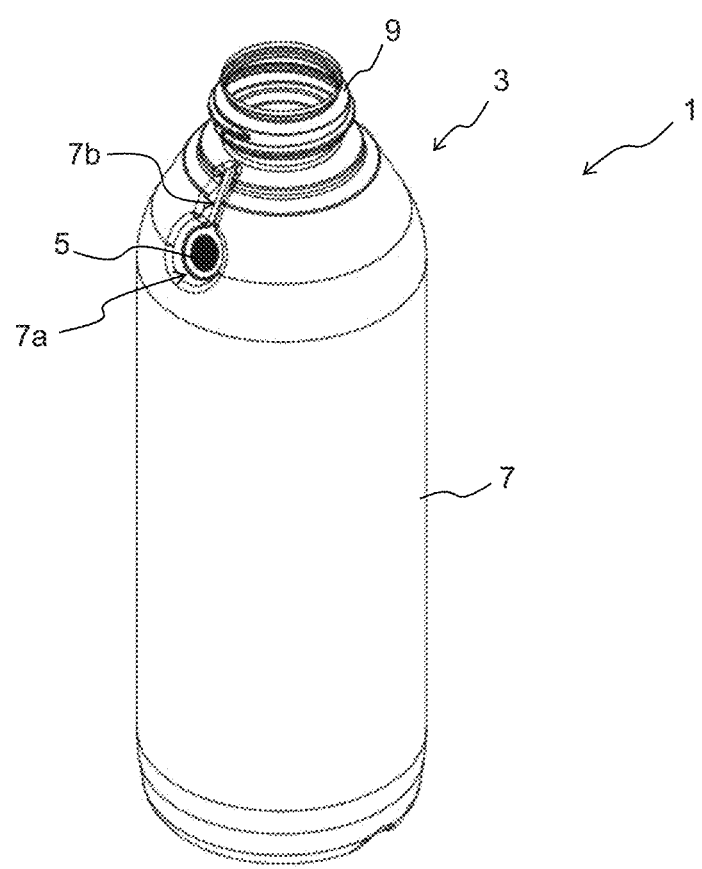
FIG. 1 is a perspective view illustrating the structure of a delaminatable container 1 in an embodiment of the present invention.
Figure 2:
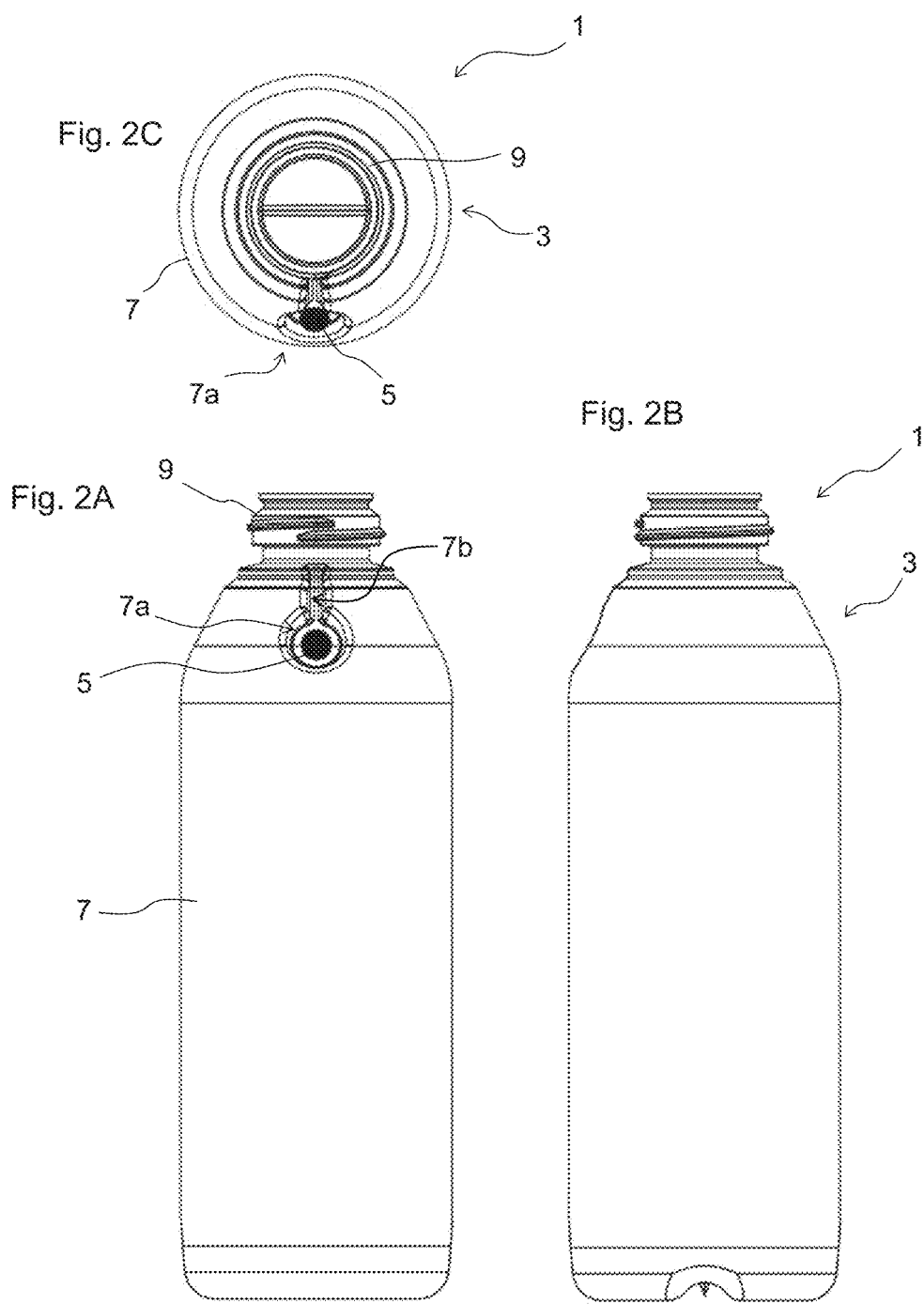
FIG. 2A is a front view of the delaminatable container 1 in FIG. 1.
FIG. 2B is a side view of the delaminatable container 1 in FIG. 1.
FIG. 2C is a plan view of the delaminatable container 1 in FIG. 1.

Embodiments of the present invention are described below. Various characteristics in the embodiments described below may be combined with each other. Each characteristic is independently inventive.

As illustrated in FIG. 1 and FIGS. 2A to 2C, a delaminatable container 1 in an embodiment of the present invention includes a container body 3 and a valve member 5. The container body 3 is provided with a storage portion 7 to store the contents and a mouth 9 to discharge the contents from the storage portion 7.

Figure 3:
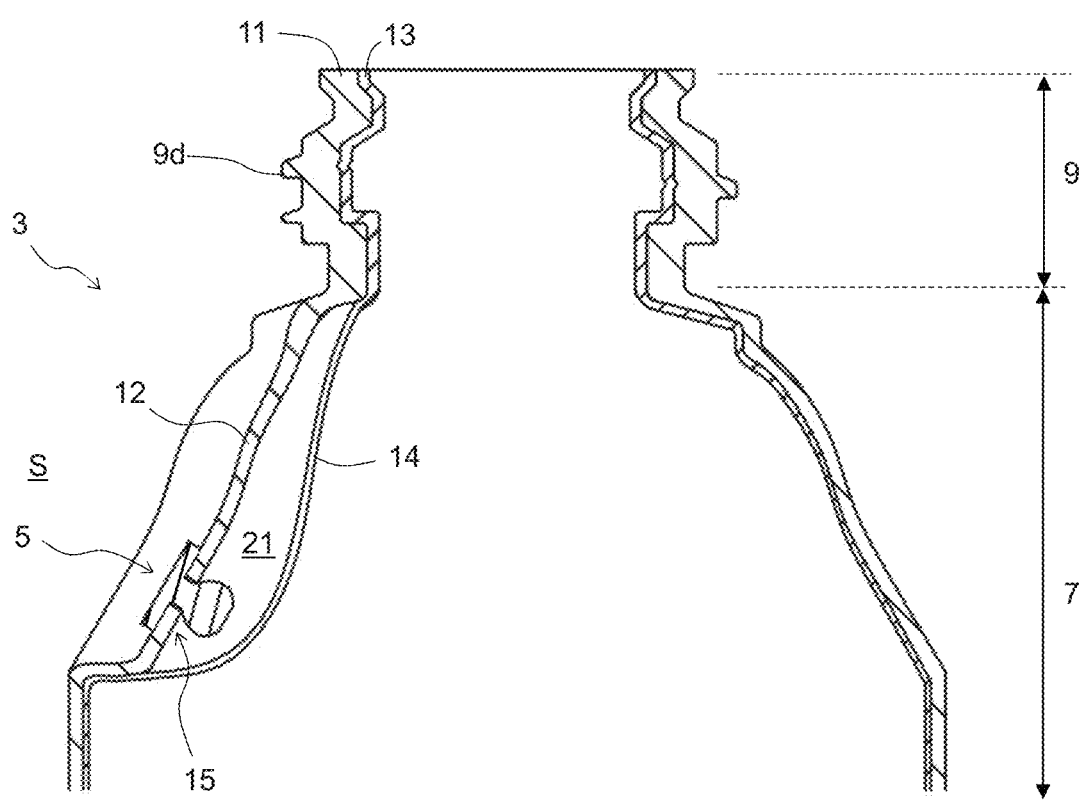
FIG. 3 is an enlarged cross-sectional view of a mouth 9 and a fresh air inlet 15 with a surrounding area of the delaminatable container 1 in FIG. 1.

As illustrated in FIG. 3, the container body 3 includes an outer layer 11 and an inner layer 13 in the storage portion 7 and the mouth 9, where the outer layer 11 constitutes an outer shell 12 and the inner layer 13 constitutes an inner bag 14. Due to delamination of the inner layer 13 from the outer layer 11 with a decrease in the contents, the inner bag 14 separates from the outer shell 12 to be shrunk. Preliminary delamination is sometimes performed to delaminate the inner layer 13 from the outer layer 11 before storage of the contents in the storage portion 7. In this case, the inner layer 13 is contacted with the outer layer 11 by blowing air or storing the contents in the storage portion 7 after preliminary delamination. The inner layer 13 then separates from the outer layer 11 with a decrease in the contents. Meanwhile, when preliminary delamination is not performed, the inner layer 13 is delaminated from the outer layer 11 in discharge of the contents to separate from the outer layer 11.

The mouth 9 is provided with an engagement section 9d engageable with a cap, not shown, having a check valve. The cap may be mounted by press fitting or threading.

The valve member 5 is, as illustrated in FIG. 3, inserted into a fresh air inlet 15 formed in the storage portion 7 to regulate entrance and exit of air between an external space S of the container body 3 and an intermediate space 21, which is between the outer shell 12 and the inner bag 14. The configuration examples of the valve member 5 include a configuration where a gap between the valve member 5 and an edge of the fresh air inlet 15 is opened and closed by movement of the valve member 5 for opening and closing of the fresh air inlet 15 by the valve member 5 and a configuration where the valve member 5 itself is provided with a through hole and an on-off valve, which acts to open and close the through hole for opening and closing of the fresh air inlet 15. In addition, configurations without providing the valve member 5 are allowed to regulate entrance and exit of air by placing a filter on the fresh air inlet 15 or by simply closing the fresh air inlet 15 with a finger or the like for discharging the contents. The fresh air inlet 15 may be provided in the mouth 9 to use a cap having a check valve in communication with the fresh air inlet 15.

The valve member 5 in any of the above configurations is configured to allow compression of the inner bag 14 by closing the fresh air inlet 15 when the outer shell 12 is compressed to introduce fresh air into the intermediate space 21 when the compressive force to the outer shell 12 is released.

The storage portion 7 is covered with a shrink film after the valve member 5 is mounted. At this point, to avoid interference of the valve member 5 with the shrink film, the valve member 5 is mounted to a valve member mounting recess 7a provided in the. In addition, not to tightly close the valve member mounting recess 7a with the shrink film, an air circulation groove 7b is provided that extends in the direction from the valve member mounting recess 7a to the mouth 9 (refer to FIG. 1).

Figure 4:
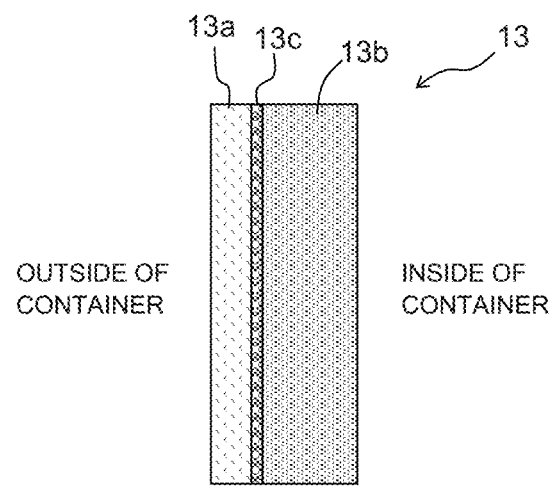
FIG. 4 is a cross-sectional view illustrating the layer structure of an inner layer 13.

Then, referring to FIG. 4, the layer structure of the container body 3 is described. The container body 3 includes the outer layer 11 and the inner layer 13. The outer layer 11 is formed thicker than the inner layer 13 so as to increase the restorability thereof.

The outer layer 11 is formed of, for example, low-density polyethylene, linear low-density polyethylene, high-density polyethylene, polypropylene, an ethylene-propylene copolymer, or a mixture thereof, or the like. The outer layer 11 may have a multilayer structure. To improve the strength of a sealing portion (bottom seal protrusion 27) of a bottom surface 29 described later, the outer layer 11 is preferably formed of high-density polyethylene.

The inner layer 13 includes, as illustrated in FIG. 4, an EVOH layer 13a provided on a container outer surface side, an inner surface layer 13b provided on a container inner surface side of the EVOH layer 13a, and an adhesion layer 13c provided between the EVOH layer 13a and the inner surface layer 13b. By providing the EVOH layer 13a, it is possible to improve gas barrier properties and delamination properties from the outer layer 11. The EVOH layer 13a is a layer containing an ethylene-vinyl alcohol copolymer (EVOH) resin and is obtained by hydrolysis of a copolymer of ethylene and vinyl acetate. The EVOH resin has an ethylene content, for example, from 25 to 50 mol %, and from the perspective of oxygen barrier properties, it is preferably 32 mol % or less. The inner surface layer 13b is a layer in contact with the contents of the delaminatable container 1. It contains, for example, polyolefin, such as low-density polyethylene, linear low-density polyethylene, high-density polyethylene, polypropylene, an ethylene-propylene copolymer, and a mixture thereof. The adhesion layer 13c is a layer having a function of adhering the EVOH layer 13a to the inner surface layer 13b.

Figure 5A:
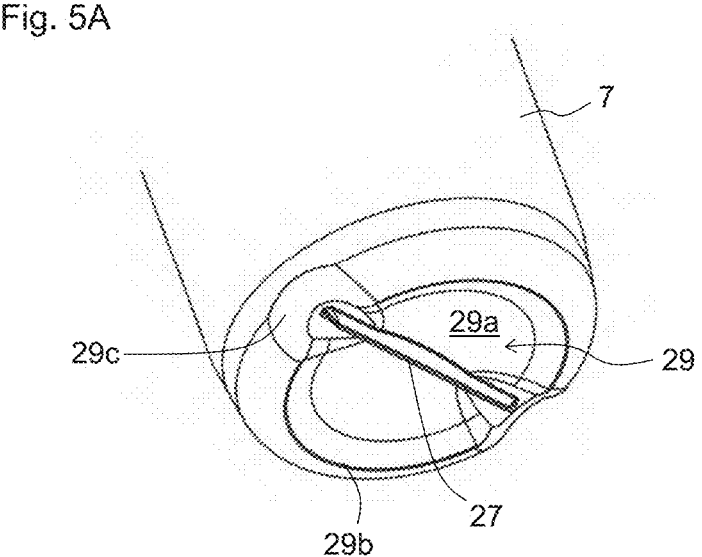
FIG. 5A is a perspective view of a region including a bottom surface 29 of the delaminatable container 1 in FIG. 1.
Figure 5B:
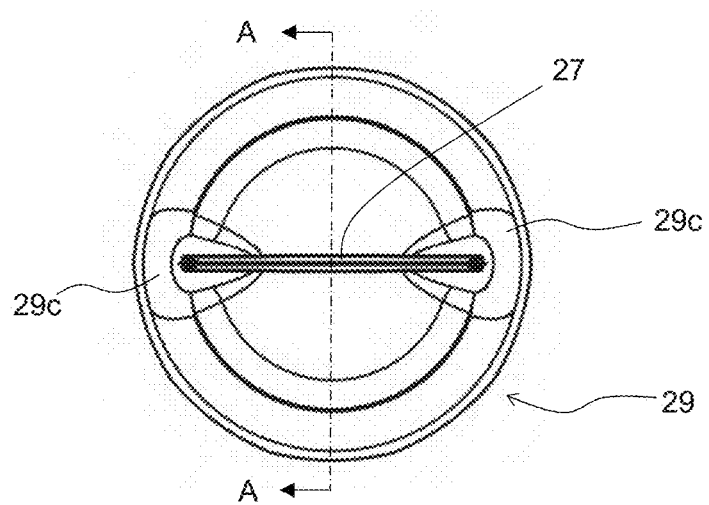
FIG. 5B is a bottom view of the delaminatable container 1 in FIG. 1.
Figure 6A:
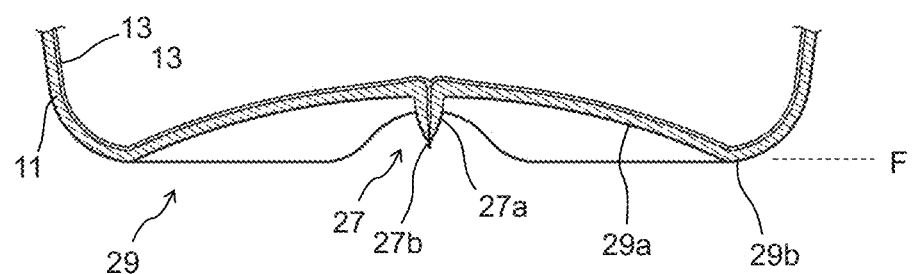
FIG. 6A is a cross-sectional view of the region including the bottom surface 29 of the delaminatable container 1 in FIG. 1 taken along an A-A cross section in FIG. 5B.
Figure 6B:
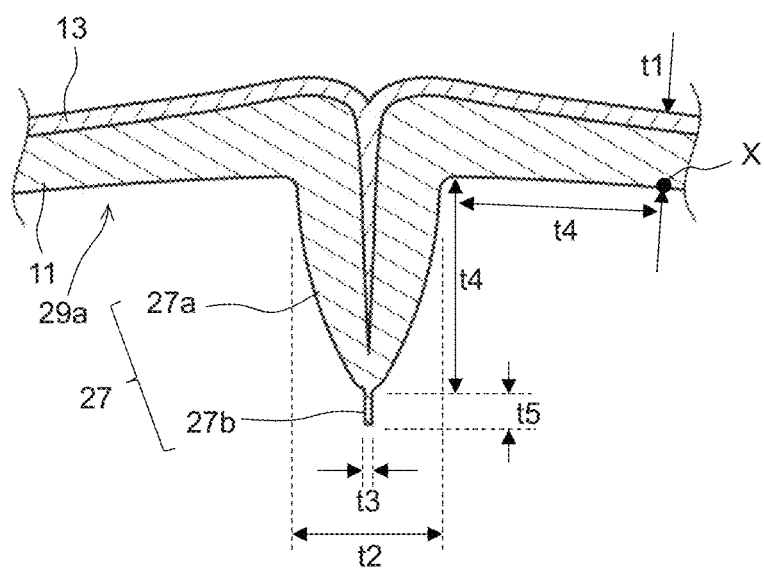
FIG. 6B is an enlarged cross-sectional view of a bottom seal protrusion 27.

Then, referring to FIGS. 5A, 5B, 6A, and 6B, the region near a bottom surface 29 of the container body 3 in the present embodiment is described. As illustrated in FIG. 5A, the storage portion 7 has the bottom surface 29 provided with a central recessed region 29a and a peripheral region 29b surrounding the central recessed region, and the central recessed region 29a includes a bottom seal protrusion 27 that protrudes from the bottom surface 29. The bottom seal protrusion 27 is, as illustrated in the enlarged cross-sectional view FIG. 6B, provided with a tapered portion 27a and a thin wall portion 27b thinner than the tapered portion. The tapered portion 27a is tapered from the bottom surface 29 toward the end. The thin wall portion 27b is formed in the end position of the tapered portion 27a. The tapered portion 27a and the thin wall portion 27b are, as illustrated in FIG. 5A, formed across the entire bottom surface 29 in a longitudinal direction (transverse direction in FIG. 5B) of the bottom seal protrusion 27. The peripheral region 29b is accordingly partially recessed, and in this area, the central recessed region 29a and a peripheral recessed region 29c are connected. The recessed region in the appended claims is constituted by the central recessed region 29a and the peripheral recessed region 29c. The thin wall portion 27b has a cross-sectional shape of a rectangle with its long sides in a direction vertical to the bottom surface 29. In the present embodiment, as illustrated in FIG. 6A, the bottom surface 29 is formed to be raised at the center, the bottom seal protrusion 27 does not protrude from the ground plane F defined by the peripheral region 29b (refer to FIG. 6A), and the thin wall portion 27b has an end positioned above the ground plane F.

As illustrated in FIG. 6A, the bottom seal protrusion 27 is equivalent to, in blow molding using a cylindrical laminated parison provided with the outer layer 11 constituting the outer shell 12 and the inner layer 13 constituting the inner bag 14, a sealing portion of the laminated parison. That is, the container body 3 in the present embodiment is configured to seal the outer shell 12 and the inner bag 14 in the bottom seal protrusion 27. In this context, to "seal" means to weld the cylindrical laminated parison and close the bottom. In the present embodiment, a ratio of the inner layer 13 to the outer layer 11 in the bottom seal protrusion 27 is less than a ratio of the inner layer 13 in another location, such as other areas in the bottom surface 29 and a side surface of the container body 3. Particularly in the end area of the bottom seal protrusion 27, as illustrated in FIG. 6B, the outer layer 11 is thus configured to be welded to each other at least in a partial region, that is, the outer layer 11 on the left and right of the sealing portion is welded not via the inner layer 13. Such a configuration allows improvement in impact resistance in comparison with a configuration where the entire outer layer 11 is welded via the inner layer 13 in the bottom seal protrusion 27. It should be noted that such a configuration, as in FIG. 6B, is not essential where the inner layer 13 does not reach the thin wall portion 27b and is broken in the tapered portion 27a. For example, even when the inner layer 11 macroscopically reaches the thin wall portion 27b, all the embodiments having the bottom seal protrusion 27 with an appearance in the above shape are included in the scope of the present invention. A method of manufacturing such a configuration near the bottom surface 29 by blow molding is described later.

In the present embodiment, a ratio of a thickness t2 (refer to FIG. 6B) of a base end of the tapered portion 27a to a thickness t1 of the bottom surface 29 of the container body 3 is preferably 2.0 or less. The ratio of the thickness t2 of the base end of the tapered portion 27a to the thickness t1 of the bottom surface 29 is more preferably from 0.5 to 1.5 and even more preferably from 0.8 to 1.2. Specifically, this ratio is, for example, 0.5, 0.6, 0.7, 0.8, 0.9, 1.0, 1.1, 1.2, 1.3, 1.4, and 1.5 or it may be in a range between any two values exemplified here. The "thickness t1 of the bottom surface 29" in this context refers to a thickness of the bottom surface 29 except for the center, that is, an area near the sealing portion of the bottom surface 29 thicker than the surroundings. The "thickness t1" is defined as, for example, a thickness of the bottom surface 29 in a position X away from the base end of the tapered portion 27a by a length same as a length of the bottom seal protrusion 27 in a vertical direction to the bottom surface 29 (refer to FIG. 6B). A ratio of a thickness t3 of the thin wall portion 27b to the thickness t2 of the base end of the tapered portion 27a is preferably from 0.01 to 0.1 and more preferably from 0.03 to 0.07. Specifically, this ratio is, for example, 0.01, 0.02, 0.03, 0.04, 0.05, 0.06, 0.07, 0.08, 0.09, and 0.1 or it may be in a range between any two values exemplified here. In addition, a ratio of a length t5 of the thin wall portion 27b in a vertical direction to the bottom surface 29 to a length t4 of the tapered portion 27a in the same direction is preferably from 0.05 to 0.3, more preferably from 0.1 to 0.25, and even more preferably from 0.15 to 0.20. Specifically, this ratio is, for example, 0.1, 0.11, 0.12, 0.13, 0.14, 0.15, 0.16, 0.17, 0.18, 0.19, 0.2, 0.21, 0.22, 0.23, 0.24, and 0.25 or it may be in a range between any two values exemplified here.

Then, an example of a method of manufacturing the delaminatable container 1 in the present embodiment is described.

Figure 7:
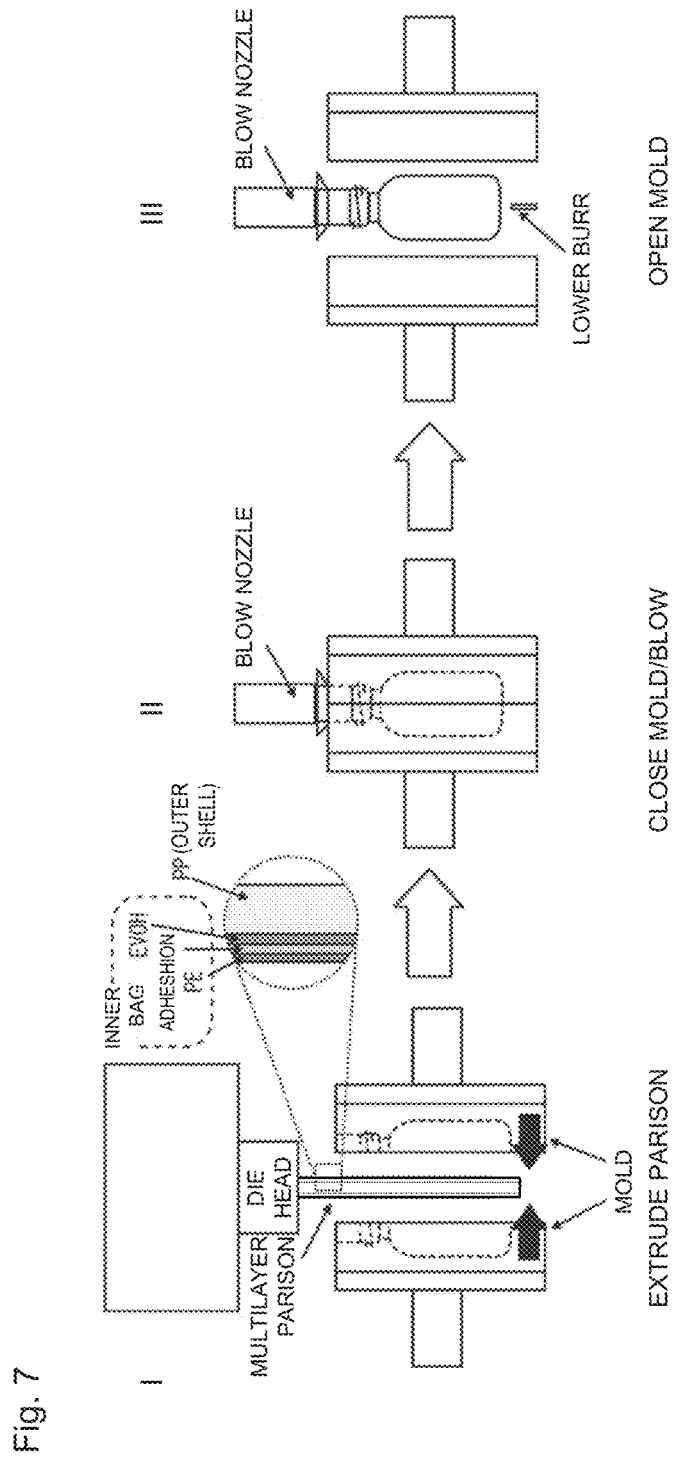
FIG. 7 illustrates a procedure of manufacturing the delaminatable container 1 in FIG. 1.

First, as illustrated in I of FIG. 7, a laminated parison in a molten state having a laminated structure (as an example, as illustrated in I of FIG. 7, in order from the container inner surface side, a laminated structure of PE layer/adhesion layer/EVOH layer/PP layer) corresponding to the container body 3 to be manufactured is extruded and the laminated parison in a molten state is set in a blow molding die 40 (refer to FIG. 8A) and a pair of split dies 40A are closed. The split dies 40A have a cavity shape to form the various shapes of the container body 3, such as the valve member mounting recess 7a, the air circulation groove 7b, and the bottom seal protrusion 27, in a blow molded article.

Figure 8A:
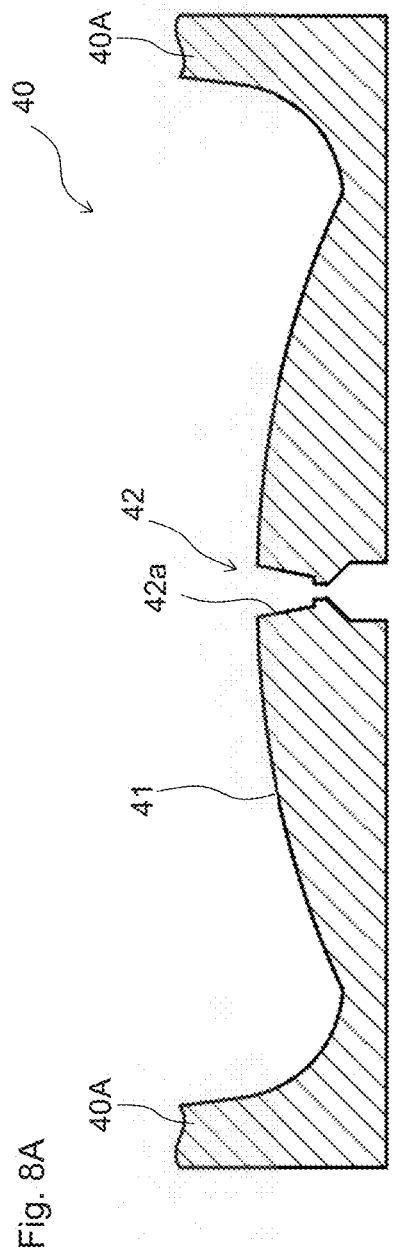
FIG. 8A is an enlarged view illustrating an area to form the bottom surface 29 of the container with a surrounding area in a die 40 used for the manufacturing procedure in FIG. 7.
Figure 8B:
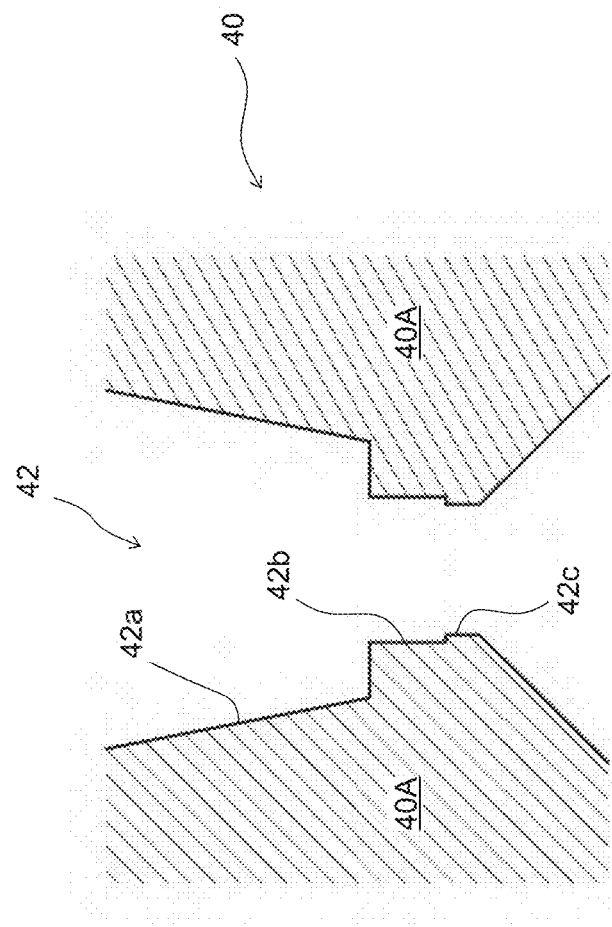
FIG. 8B is an enlarged view illustrating an area to form the bottom seal protrusion 27 in the die 40 in FIG. 8A.

At this point, referring to FIGS. 8A, 8B, and 9A to 9D, a detailed description is given to molding the shape of the bottom surface 29 of the container body 3 with a surrounding area by the blow molding die 40. First, FIG. 8A is an enlarged view illustrating an area in the blow molding die 40 to mold the bottom surface 29 of the container with a surrounding area. As illustrated in FIG. 8A, each split die 40A includes a bottom surface forming portion 41 to mold the bottom surface 29 and a protrusion forming portion 42 to mold the bottom seal protrusion 27. More in detail, as illustrated in the enlarged view of FIG. 8B, the protrusion forming portion 42 is provided with a tapered surface 42a to mold the tapered portion 27a of the bottom seal protrusion 27, the tapered surface 42a inclined to be directed inside the container, a thin wall forming portion 42b to mold the thin wall portion 27b, and a pinch-off 42c.

Figure 9A:
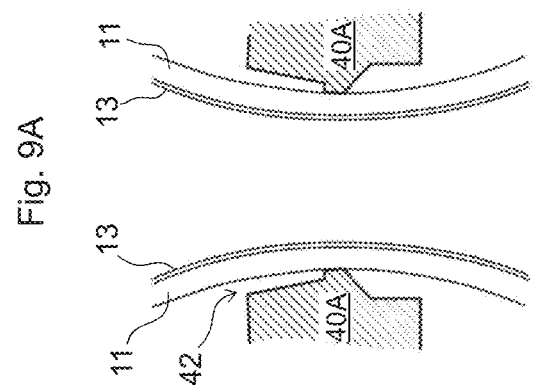
FIGS. 9A to 9D are diagrams illustrating the laminated parison during die closure by gradually closing a pair of split dies 40A.
Figure 9B:
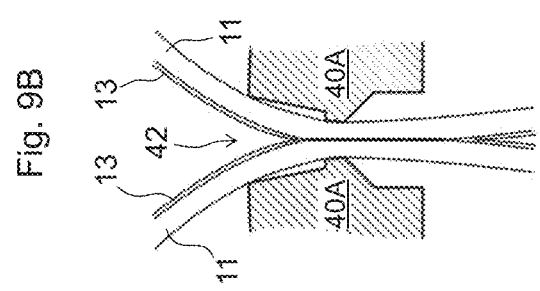
Figure 9C:
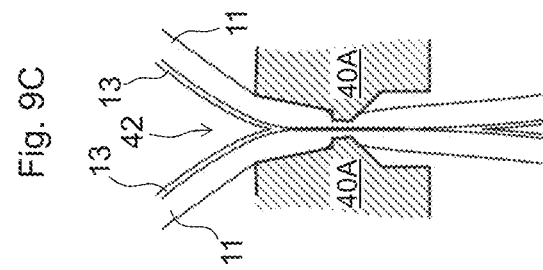
Figure 9D:
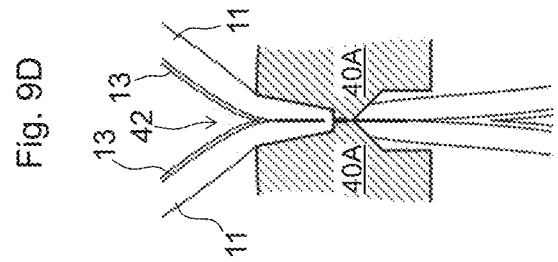

Then, FIGS. 9A to 9D illustrate the laminated parison during die closure by gradually closing the pair of split dies 40A. From the state before die closure in FIG. 9A, the split dies 40A are gradually closed and the cylindrical laminated parison is pressed inwardly by the thin wall forming portions 42b and the pinch-offs 42c of the split dies 40A, and as illustrated in FIG. 9B, the inner layer 13 of the laminated parison firstly abuts on each other. The split dies 40A are further closed from this state to compress the laminated parison, as illustrated in FIG. 9C, by the thin wall forming portions 42b and the pinch-offs 42c and further the tapered surfaces 42a. Then, as illustrated in FIG. 9D, the dies are fully closed to form the tapered portion 27a and the thin wall portion 27b and split the laminated parison into two by the pinch-offs 42c.

As the split dies 40A are closed as illustrated in FIGS. 9B to 9D, the laminated parison having the outer layer 11 and the inner layer 13 is gradually compressed. In the present embodiment, since the split dies 40A have the tapered surfaces 42a inclined to be directed inside the container, the laminated parison is pressed in the direction inside the container (upward direction in FIGS. 9A to 9D). The inner layer 13 positioned inside the laminated parison then readily moves in the direction inside the container providing a wider space (refer to arrows in FIGS. 9C and 9D), and in the bottom seal protrusion 27 (tapered portion 27a and thin wall portion 27b) after die closure, the ratio of the inner layer 13 to the outer layer 11 becomes less compared with a case of the split dies 40A having no tapered surfaces 42a. As a result, in the bottom seal protrusion 27, the outer layer 11 is compressed and welded to each other at least in a partial region to improve impact resistance in comparison with a configuration where the inner layer 13 reaches the end and is welded to each other, allowing manufacture of the delaminatable container 1 causing no separation of the bottom seal protrusion 27 even when impact is applied. It was confirmed by experiments that the movement of the inner layer 13 in the direction inside the container is also accelerated by providing the thin wall portion 27b.

After closing the pair of split dies 40A as described above, as illustrated in II of FIG. 7, a blow nozzle is inserted into an opening on the mouth 9 side of the container body 3 to blow air into the cavities of the split dies 40A in the state of die closure. Then, as illustrated in III of FIG. 7, the split dies 40A are opened to take out the blow molded article. At this point, lower burrs are formed in the area below the bottom seal protrusion 27 and they are removed.

The container body 3 molded as described above is then subjected to the known procedure of the inner layer preliminary delamination, the fresh air inlet 15 opening, the valve member mounting, and the like to complete the product.

The present invention is allowed to be carried out in the following embodiments. Although the bottom seal protrusion 27 in the above embodiment is configured by the tapered portion 27a and the thin wall portion 27b, the thin wall portion 27b is not essential. Even without the thin wall portion 27b, the tapered shape of the bottom seal protrusion 27 causes welding of the outer layer 11 to each other during die closure to allow improvement in impact resistance.

REFERENCE SIGNS LIST

1: Delaminatable Container, 3: Container Body, 5: Valve Member, 7: Storage Portion, 9: Mouth, 11: Outer Layer, 12: Outer Shell, 13: Inner Layer, 14: Inner Bag, 15: Fresh Air Inlet, 27: Bottom Seal Protrusion, 27a: Tapered Portion, 27b: Thin Wall Portion, 29: Bottom Surface, 29a: Central Recessed Region, 29b: Peripheral Region, 29c: Peripheral Recessed Region, 40: Blow Molding Die, 40A: Split Die, 41: Bottom Surface Forming Portion, 42: protrusion forming portion, 42a: Tapered Surface, 42b: Thin Wall Forming Portion, 42c: Pinch-Off

The invention claimed is:

1. A method of manufacturing a delaminatable container, containing a container body having an outer shell and an inner bag, the inner bag to be shrunk with a decrease in contents, the method comprising:

blow molding using a cylindrical laminated parison including an outer layer constituting the outer shell and an inner layer constituting the inner bag, wherein, in the blow molding, a bottom seal protrusion protruding from a bottom surface of a storage portion of the container body including a tapered portion and a thin wall portion is formed using a die having a pair of tapered surfaces and a pair of thin wall forming portions, the tapered portion is formed near the pinch-off by the pair of tapered surfaces extending along the longitudinal direction of a pinch-off and inclined to be directed inside the container, the thin wall portion is formed by the pair of thin wall forming portions being provided on the pinch-off side from the tapered surfaces extending along the longitudinal direction of the pinch-off and being with an interspace narrower than the pair of tapered surfaces.

* * * * *